United States Patent [19]

Lin

[11] Patent Number: 5,577,237

[45] Date of Patent: Nov. 19, 1996

[54] PROTOCOL TIMER AND METHOD OF USING SAME

[75] Inventor: William Lin, Sunnyvale, Calif.

[73] Assignee: Tandem Computers, Incorporated, Cupertino, Calif.

[21] Appl. No.: 377,301

[22] Filed: Jan. 23, 1995

[51] Int. Cl.⁶ .................................................. G06F 11/00
[52] U.S. Cl. ........................... 395/555; 395/185.08
[58] Field of Search ........................ 395/185.08, 550; 370/60, 94.1; 371/5.1, 6, 12, 62

[56] References Cited

U.S. PATENT DOCUMENTS 5,086,428   2/1992   Perlman et al. ................. 370/94.1
5,442,637   8/1995   Nguyen ............................ 370/94.1

*Primary Examiner*—Thomas M. Heckler
*Attorney, Agent, or Firm*—Graham & James LLP

[57] ABSTRACT

An improved network timer for use in a network node, preferably a reliable mode network employing IPX/SPX data packets on workstations or computer. A method and apparatus is disclosed for use by a workstation node whereby a plurality of data packet timers may be supported and set, triggered and deleted in a maximum of K operations or time increments, where K is a constant and not a function of N.

9 Claims, 6 Drawing Sheets

PROTOCOL TIMER AND METHOD OF USING SAME

BACKGROUND OF THE INVENTION

This invention relates to an improved software-driven timer to be used in reliable network protocols.

Conventional network protocols need to be able to time various events. For example, in the IPX/SPX protocol, when a data packet is sent, a timer for the message is set to a timeout value. The IPX/SPX protocol is described in the publication "Inside Netware for Unix, Ver. 3.11" by Susan Purcell and Judy Wilson (Novell Research Report, (c) 1992), which is herein incorporated by reference. If the message is not received by its intended receiver before the timer times out, the message is re-sent. Some network systems have thousands of timers operating at once.

Conventional timers used in a network have the problem that, as more timers are added to the network, it takes longer to add and delete each timer. Thus, the time needed to add and delete conventional timers increases linearly as the number of timers in the system increases. What is needed is a timer mechanism that allows timers to be added to the system without significantly increasing the amount of time needed to add and delete timers.

SUMMARY OF THE INVENTION

The present invention is a method and apparatus to provide an improved timer mechanism for communication protocols in a network, preferably in a network employing IPX/SPX. A method and apparatus is disclosed whereby a plurality of N timers may be supported in the timer mechanism and the N timers may be set, triggered and deleted with a maximum of K operations or time increments, where K is a constant and not a function of N, that is, in O(1) (order one).

DETAILED DESCRIPTION OF THE PREFERRED EMBODIMENTS

Figure 1:
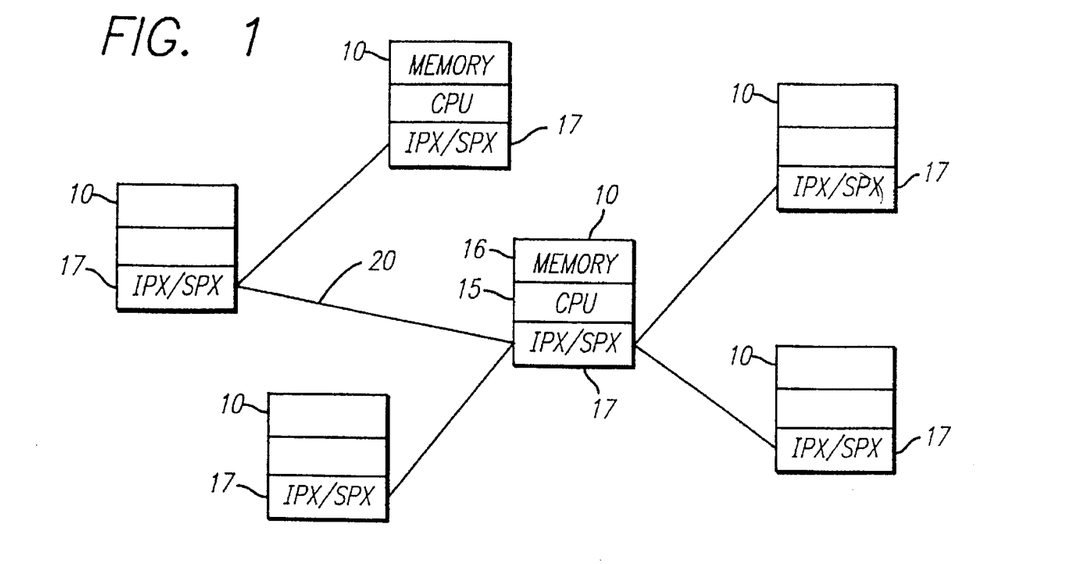
FIG. 1 is a schematic of a network employing the timer of the present invention.

Referring to FIG. 1, there is shown a generalized network, which may be a LAN or WAN, having a plurality of nodes or workstations 10. Each workstation may consist of a personal computer client or server, having a CPU 15 primary storage memory 16 such as RAM, secondary storage memory (not shown), such as disk drives, and a keyboard, monitor and other I/O ports, as needed. The data structures associated with the present invention are stored in the primary storage memory of the workstation, and are preferably used in connection with the IPX/SPX data packet protocol program 17 running under Novell Netware, though the invention disclosed herein may be generalized to other data packet protocols. The nodes 10 communicate with one another through the I/O ports on a communication channel 20 by passing packets of data, generally in a "store-and-forward" message switching scheme, though the timer protocol of the present invention is not limited to message switching techniques, and in general any communication scheme may be employed.

One of the most important tasks of a reliable network protocol is to set (add), delete and trigger (process or 'pop') a timer for each data packet sent out by a local (host) node to a remote node. It should be understood by one skilled in the art that processor 15 in a node 10 controls the disclosed steps relating to adding, deleting or popping a timer.

Every data packet sent out by a node will not necessarily be received. Hence a timer, called a "retransmission timer" is set for retransmission of the packet and the packet is retransmitted in the event the timer expires. To facilitate this a retransmission function may be associated with the timer to be triggered when the timer times out. If a packet is successfully received by a remote node, the retransmission timer for that packet is canceled or deleted, and cannot thus expire. If a packet is not successfully received by a remote node, the host node network protocol program 17 will not receive an acknowledgement within a certain predetermined time, and the timers will continue to remain in force, that is, the timers will be set to expire (to trigger or "pop"), and will not be canceled (deleted). When the timer is triggered (or "popped."), the timer is expired, and this event may be used by the host node to invoke other functions (called "handlers"), such as retransmission of the unsuccessfully transmitted data packet associated with the expired timer.

Figure 6:
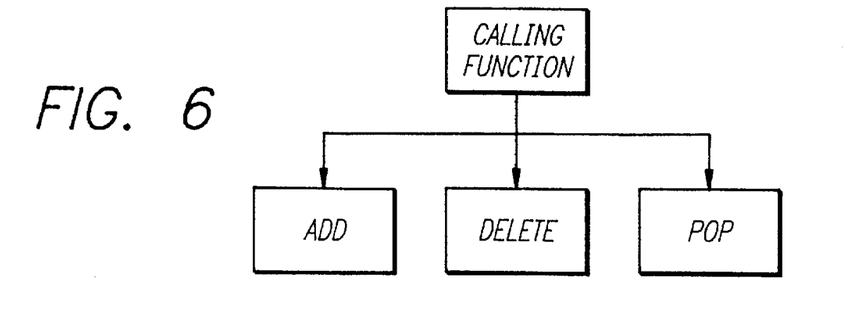
FIGS. 6–9 are flowcharts summarizing the steps of the present invention.

Thus in the present invention there are three external functions that may be executed by CPU 15 in a workstation utilizing the present invention: adding a timer, deleting a timer, and popping (triggering) timers that have expired. These functions are shown in FIG. 6.

In the present invention data packet timers are constructed as data objects stored and executed by the particular computer system architecture being used, and, as such interact with the hardware associated with the timer of the computer system. Generally, this process is termed a "protocol timer mechanism".

Typically under a reliable communication protocol, each data packet sent out has its own timer set that expires at a different predetermined time from other data packets. The predetermined time depends, for example, on the size of the data packet sent, the distances between nodes, and the prior history of delay in the network. Most network protocols call for timers to have a small expiration time, generally less than a second. It has been observed in the present invention that by and large timers only need to be accurate to a certain granularity, that is, a certain minimum unit time interval, or clock ticks, which in a preferred embodiment is 0.01 seconds. The minimum bound for granularity is set by the network operating system and/or architecture. Thus Unix machines generally have a granularity of no less than $10^{-3}$s (1 ms), while computers running Tandem NonStop™ Kernel have a granularity of $10^{-6}$s (1 us). However, a user may set the granularity for the present invention at any number of increments greater than the minimum bound for granularity.

In the present invention it has been observed that infinitely adjustable time granularity may be sacrificed for the sake of reducing the number of operations in manipulating software-driven timers. Conventional techniques rely on manipulating N software-driven timers by incrementing and decrementing data structures members formed in an arbitrarily long linked list, by traversing the entire linked list and comparing each member therein to system time. Such processes, while in theory allowing for infinitely adjustable time granularity, are bounded by O(N) steps rather than O(1)

as in the present invention. By sacrificing infinitely adjustable time granularity, the present invention achieves a reduction in processor steps to manipulate timers from O(N) to O(1).

A preferred embodiment of the present invention will now be described. In general a high level language should be employed to implement the data structures, used in this embodiment. The high level language should support dynamic allocation of memory, pointers and arrays. In a preferred embodiment as described herein, the C language was used and the data structure is housed in primary storage memory, such as random-access memory. Further one skilled in the art should appreciate that the software instructions implementing the invention described herein also preferably reside in the computer's primary storage memory 16. Together, the code, data structures and computer hardware incorporating the same form an integrated whole to implement the present invention.

Figure 2:
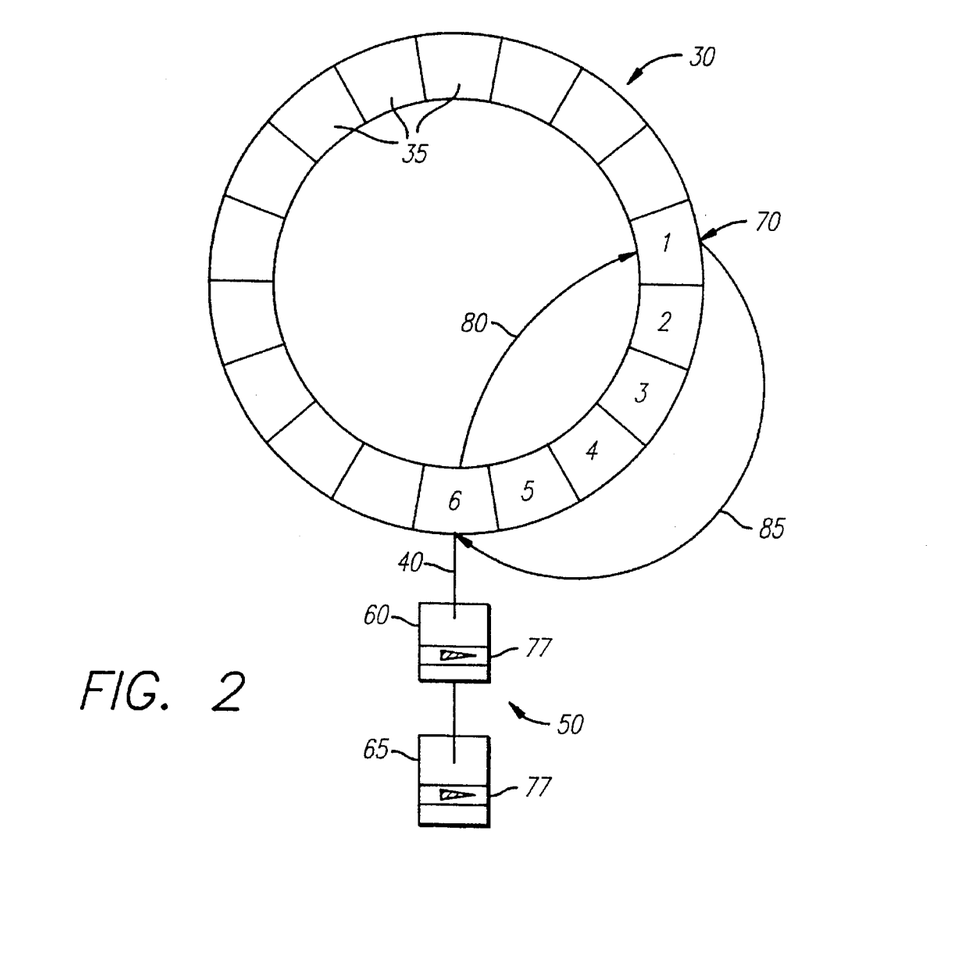
FIGS. 2–5 are conceptual representations of a preferred data structure used to implement the timer of the present invention, for use in showing the operation of the add, delete, and pop functions.

Referring to FIG. 2, a circular array 30 is employed, where certain cells 35 of the circular array contain a reference to an array entry comprising a structure of pointers. The cells that store such structure of pointers are deemed "non-empty" cells. By way of example, the non-empty cells in FIG. 2 would include cells 1 and 6; in FIG. 3 the non-empty cells would include cells 1, 4 and 6; in FIG. 4 the non-empty cells would include cells 1, 4, 6, 8 and 11, and in FIG. 5 the non-empty cells would include cells 1 and 4.

The pointers within the structure referenced by each non-empty cell include pointers to both other adjacent non-empty cells, as explained herein, and to a pointer to a time storage entry (TSE) (a data structure in computer memory) such as TSE 60 which may have one or more members within it, and which may itself be connected to another TSE such as TSE 65 to form a linked list (LL) 50 as shown in FIG. 2. In general, several TSE's sharing the same non-empty cell will be connected together with a linked list. The non-empty cells themselves are associated or linked to one another and to an initial reference cell in a doubly linked list (DLL).

Figure 3:
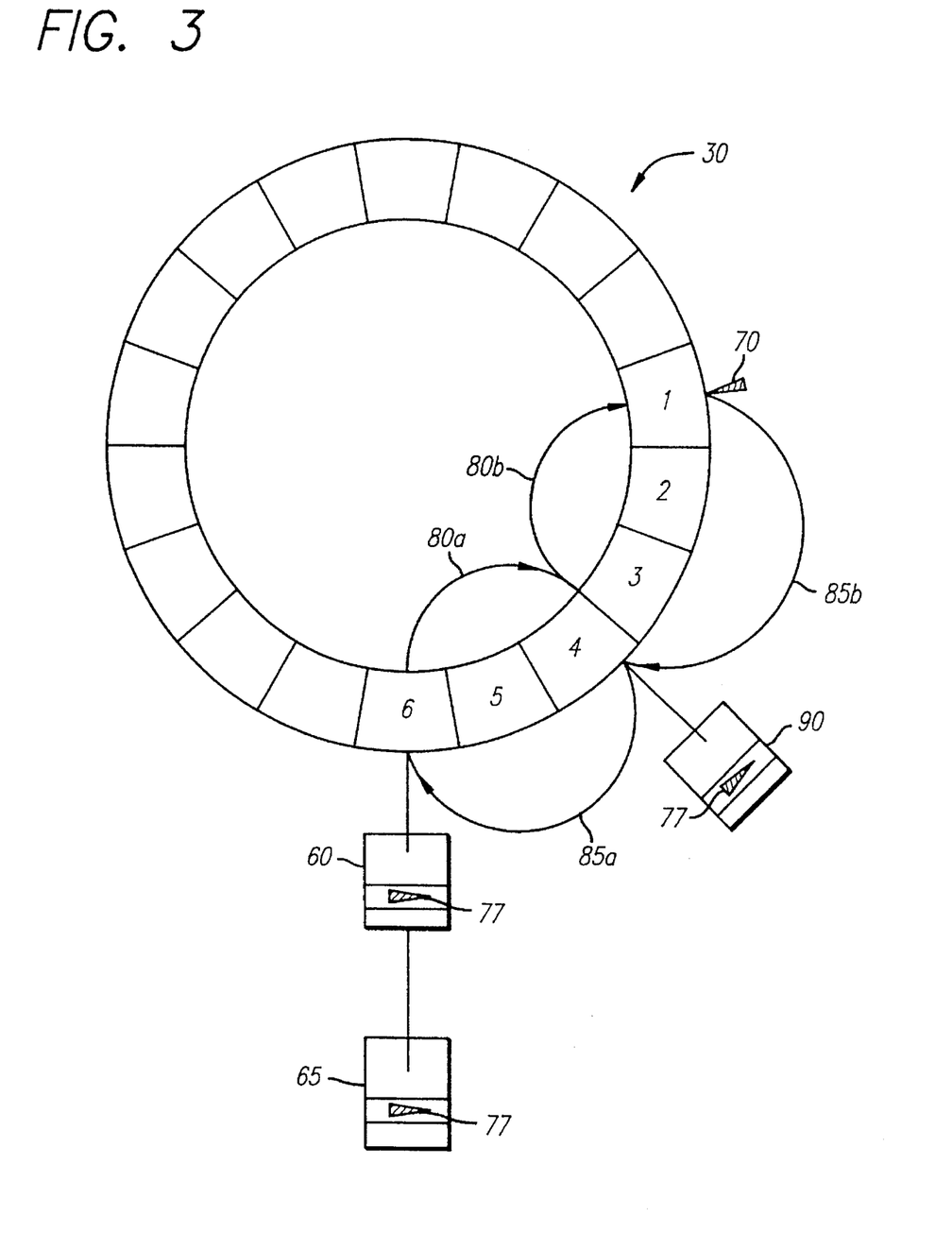
Figure 4:
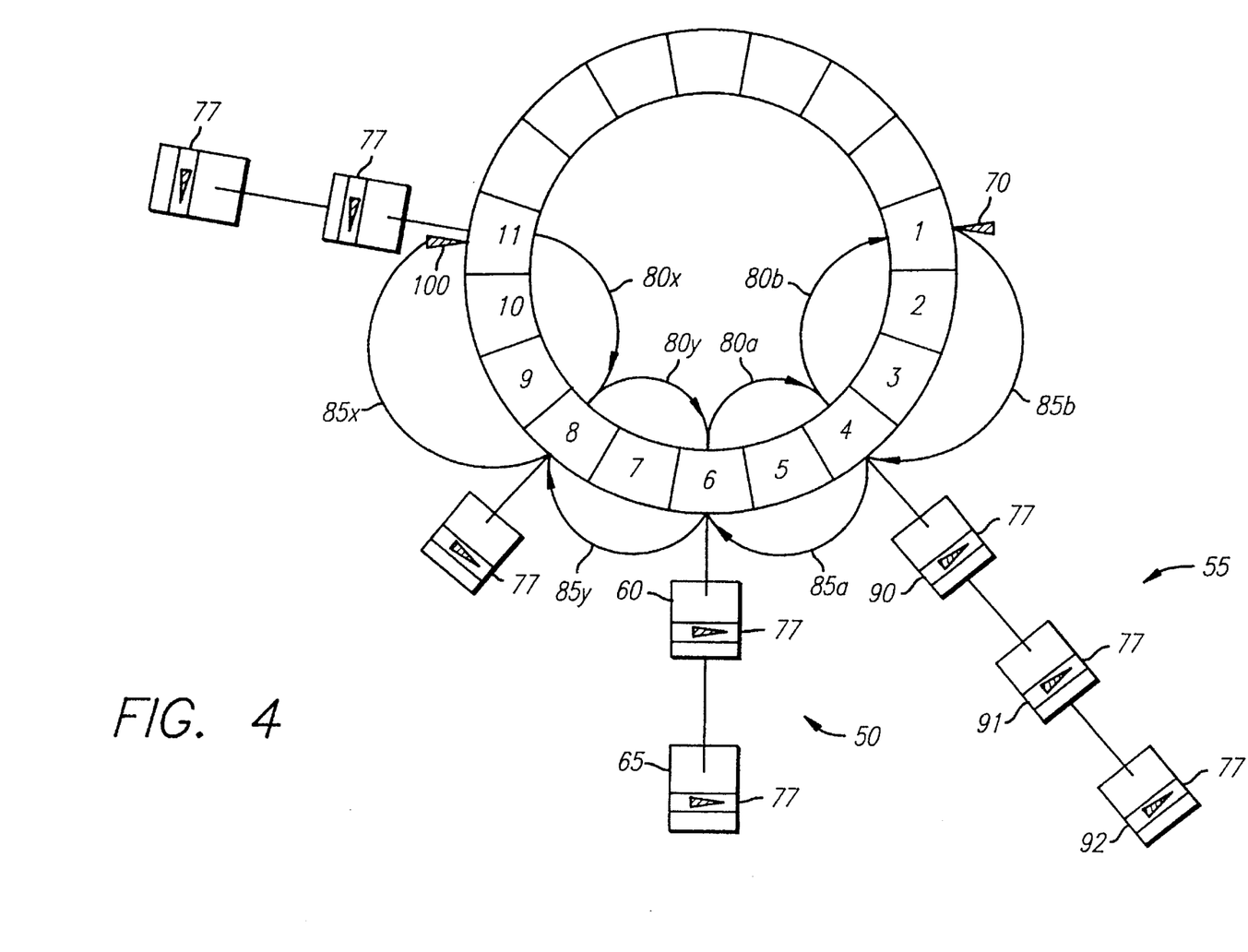

Thus, in FIG. 2 for example, the DLL comprises reference cell 1 and cell 6, linked together with forward and backward pointers 80, 85. In FIG. 3, where there are three non-empty cells, reference cell 1, cell 4 and cell 6, the forward and backward pointing pointers 80*a*, 80*b* and 85*a*, 85*b* reference and link together these non-empty cells as shown. In FIG. 4, where there are five non-empty cells, cells 1, 4, 6, 8 and 11, and pointers 80*x*, 80*y*, 80*a*, 80*b* and 85*x*, 85*y*, 85*a*, 85*b* form a doubly linked list linking together these non-empty cells together with the reference cell 1.

The initial reference cell, cell 1 in FIGS. 2–4, represents an initial reference time from which all subsequent circular array cells (each measuring a particular granularity of unit time) are measured. Each cell 35 of circular array 30 represents one unit of time granularity, so that the nth cell represents n time units from the initial reference cell 1, and thus corresponds with elapsed time as measured from the reference cell in a one-to-one manner. If there are several structures sharing the same time slot (TS), that is, the same cell of the circular array, such as time storage entries 60, 65 in FIG. 2, then the time storage entries are joined to one another in a linked list, as in linked list 50, or linked list 55 linking the plurality of TSE's 90, 91, 92 sharing the same TS of cell 4 in FIG. 4. Each time storage entry may include a member with a pointer to a function (a "handler"), such as represented conceptually by reference arrow 77 in the figures, that will be executed when the timer is triggered ("popped"). The total number of cells that constitute the circular array is determined by the maximum time supported by the circular array (generally, less than one minute) divided by the predetermined granularity. In the preferred embodiment there are two circular arrays: one circular array with a granularity of 0.01 seconds stores timer storage entries that will expire in less than a second, and a second circular array with a granularity of 1 second stores timer storage entries that expire in less than a minute.

Note that the desired granularity is determined by a particular protocol, and can be adjusted to be greater than the minimum bound for granularity, which is hardware dependent, by simply specifying that each cell of the circular array 30 represents some multiple of the minimum bound.

Referring again to the figures, circular array 30 has an initial starting point 70, that represents an initial time forming a point of reference from which to measure elapsed time, in unit time increments determined by the chosen granularity. As before, a doubly linked list, represented by the arcuate lines, links together all non-empty cells of the circular array, that is, cells that contain time storage entries.

Each of the structures or time storage entries, such as TSE's 60, 65 in linked list 50 of FIG. 2, is associated with a timer associated with a particular data packet. Thus the presence of two time storage entries 60, 65 in cell 6 indicates that two data packets will have their timers set to expire 5 time units from the reference starting time (cell number 1). Thus, time storage entries 60, 65 share the same time slot (TS). Each cell of the circular array may reference one or more of such data packet timers 60, 65. Of course it is understood by those skilled in the art that a circular array is a conceptual device that in fact represents array storage locations in a computer's memory that are continuously reused, and that in the C language a circular array must be constructed as it is not a predefined data type.

When a new data packets is sent from a local node to a remote node another timer must be set, that is, added, to the circular array. The particular cell number or index to which the timer are added depends on the units of time from the time reference cell (cell 1 in FIGS. 2–4), that the timer is set to expire from. Thus, in FIG. 2, each of the two timers set to expire five units from a reference time associated with cell no. 1 would be associated with a time storage entry stored in a linked list associated with cell no. 6. If timers are added to a non-empty cell of the circular array 30, then they are simply added to the end of the existing linked list found in that non-empty cell, such as linked list 50. If, however, a timer becomes associated with a formerly empty cell, the now non-empty cell must be inserted into the doubly linked list in the circular array, by rearranging the pointers as suggested by comparing FIGS. 2 and 3 using techniques known to persons of ordinary skill in the art.

Thus, turning attention now to FIG. 3, there is shown how a structure or time storage entry 90 is inserted in a formerly empty cell (cell number 4, when compared with FIG. 2) of circular array 30, that lies before the data packet timers 60, 65. Time storage entry 90 thus may represent a data packet timer that is set to expire before the data packet timers of time storage entries 60, 65, in particular, two time units of granularity before, and three units of time from the initial reference time. To insert timer 90 to expire three time units from the starting point 70 as shown, the CPU 15 simply indexes to the fourth cell of the circular array 30, and references the first time storage entry 90 with the fourth cell of array 30. The now non-empty cell 4 is included as a part of the double linked list (represented by arcs 80*a*, 80*b*, 85*a*, 85b) with all the other non-empty cells in circular array 30. This is easily done by one skilled in the art with conventional pointer insertion routines, such as by finding the first greater numbered cell that is not empty (here cell 6) and inserting the pointer associated with the now non-empty cell (here cell 4) between the pointers associated with cell 6 and cell 1, as depicted graphically by comparing FIG. 2 with FIG. 3. In this way the non-empty cells are linked together in a doubly linked (forwards and backwards) linked list, such as through the arcuate pointers 80a, 80b, 85a, 85b shown in FIG. 3, and the plurality of arcs 80a, 80b, 80x, 80y and 85a, 85b, 85x, 85y shown in FIG. 4.

Since the ordering of each cell of circular array 30 has a one-to-one correspondence with elapsed unit time increments, or time granularity, the timers associated with 60, 65 and 90 are automatically ordered. In a similar manner the entire circular array may be selectively filled in predetermined cells with doubly linked list elements, as depicted by FIG. 4. If more than one timer is associated with a particular cell, that is, if more than one timer is set to lapse at the same time, these timers may be chained together at the end of any preexisting linked list associated with that cell, as shown by comparing the fourth cell in FIG. 3 to the fourth cell of FIG. 4, the latter figure showing three stored TSE's linked together while the former figure shows one TSE.

Throughout the described protocol program there should be a provision in the timer module that associates in a one-to-one mapping each timer with a data packet sent by a local node, identified with a unique packet identification number (ID). Furthermore, each packet ID may be mapped in a one-to-one (unique) mapping with a particular TSE and the particular cell 35 in the circular array 30 that the TSE is found in. If a timer is to be deleted (canceled), such as if the data packet has been successfully received by a remote node and an acknowledgement signal associated with this packet is received by a local node, the TSE associated with the packet (say TSE 60) is looked up along with the cell in the circular array it is found in (here cell 6) and the TSE is deleted from the linked list it is found in (such as linked list 50). When the TSE is removed any necessary rearranging of references between non-empty array cells and any remaining TSE's, such as TSE 65, are made. This way there is no need to traverse the entire doubly linked list of the circular array from cell 1 in order to delete a particular TSE.

When deleting a time storage entry (TSE) makes the cell empty, such as if TSE's 65 and 60 are deleted in FIG. 4, the additional steps of rearranging pointers such as 80a, 80y and 85a, 85y are performed, so that the now empty cell is not part of the doubly linked list formed by these pointers. Hence, in FIG. 4, removing an empty cell 6 from neighboring non-empty cells such as cell nos. 4 and 8 would necessitate rearranging the forward and backward pointers so they would not reference cell 6.

Figure 5:
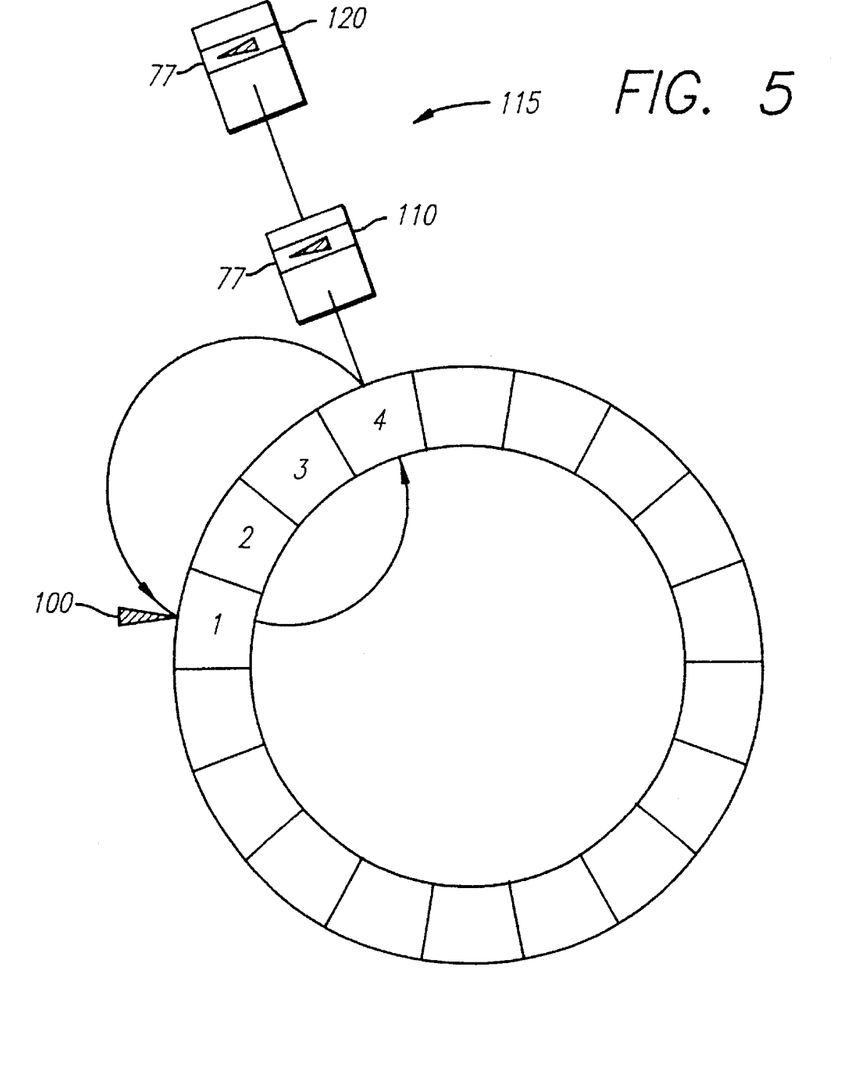

Turning attention now to FIGS. 4 and 5, the popping or triggering of data packet timers is described. Note a distinction should be made between popping a time storage entry and deleting a time storage entry. Deletion occurs every time a data packet is successfully sent by a local (sending) node and an acknowledgement is received from a remote (receiving) node. The timer for that data then is no longer needed and is deleted. By contrast, popping occurs only every so often when it is desired to see which timers have expired between the reference time (cell 1) and some other time, say an elapsed time 10 units from the reference time (indicated as cell 11 in FIG. 4, marked by reference number 100).

Popping or triggering of the expired timers occurs at a given lapsed time from the initial time. Typically, for retransmission timers, these expired timers are associated with data packets that should have been received by a remote node but were not. That is, no acknowledgment was received by the local sending node and hence these timers were not deleted from the circular array.

Referring in particular to FIGS. 4 and 5, let cell marker 100 correspond to an elapsed time of 10 units of granularity from the starting time referenced by and from cell 1. To check for expired timer storage entries between the initial time associated with cell 1 (pointer 70) and lapsed time associated with cell 11, one simply traverses the double linked list from cell 1, by following all the forward pointers such as 80a, 80b, 80x, 80y, which reference (link) non-empty cells between the reference cell 1 and the cell 11 associated with the predetermined lapsed time. These linked non-empty array cells by definition will contain timer storage entries associated with timers which have expired, since these array cells are defined as time slots that lie between the initial reference time cell (cell 1) and the given, elapsed time cell (cell 11). Thus, there is no need to check any timer associated with a time storage entry with system time or a system clock to see if the timer has lapsed. Moreover, there is not any need to decrement any timer, as with conventional techniques. In this way the present invention is bounded by O(1), e.g., a constant number of processor operations or elapsed time in clock ticks no matter how many timers are included in the system.

As the time storage entries in each nonempty cell are traversed and examined by the processor, they contain one or more pointers referencing a "handler" function or functions 77, that are executed by calling the functions associated with the pointer(s). For instance, in the case of retransmission timers, the function executed may have the local node 10 retransmit the packet associated with the expired timer. In general, however, any function can be executed. This entire process is called 'popping'.

After traversing and processing an expired time storage entry (popping), the time storage entry is removed from the linked list of TSEs, and after all such TSEs are removed from a given non-empty cell, the array entry associated with the non-empty cell is removed from the doubly linked list, and any memory associated any data structure is reallocated. After all time storage entries are processed for the K number of non-empty cells between cell markers 70 and 100, there should be no more lapsed data packet timers between these two cells. Thereafter, cell marker 100, that is, cell 11, becomes the new reference start time from which elapsed time is measured, and the process repeats itself. Cell 11, the new reference cell, becomes like old reference cell 1, and represents an initial reference time. Thus, as shown in FIG. 5, a number of time storage entries (structures) 110, 120 may be placed at a predetermined number of cells from the new reference cell 1, in a linked list 115, in the same manner as time storage entries 60, 65 were added in linked list 50 in FIG. 2, as new timers are set, and the process repeats.

Furthermore, a network protocol may have a plurality of circular arrays 30, each representing different granularities and each holding a different maximum number of entries, for different maximum times that can be accommodated (with the maximum time accommodated per circular array, as before, simply being the size of the circular array times the granularity specified). As before, in a preferred embodiment there is one circular array to store timer storage entries that will expire in less than a second, and another circular array to store timer storage entries that expire in less than a minute.

Turning now to FIGS. 6–9, there are depicted flowcharts describing a preferred embodiment of the invention and intended to augment and in no way diminish the foregoing description.

FIG. 6 shows a flowchart depicting how a calling function (or more generally, the protocol program) may call and interact with three functions or subroutines of the present invention, which would be extern functions in the C language: the Add function (which adds a time storage entry), the Delete function (which deletes a time storage entry), and the Pop function (which executes the handler(s) associated with a time storage entry and removes the TSE). The Add, Delete and Pop functions may of course call other, static functions found in the module associated with these functions to help them implement routine operations that are known to persons of ordinary skill, such as insertion or deletion of a pointer in a linked list. Again it should be understood by one skilled in the art that the Add, Delete, and Pop functions, and all other associated functions and subroutines described herein are implemented by a processor 15.

Figures 7, 8:
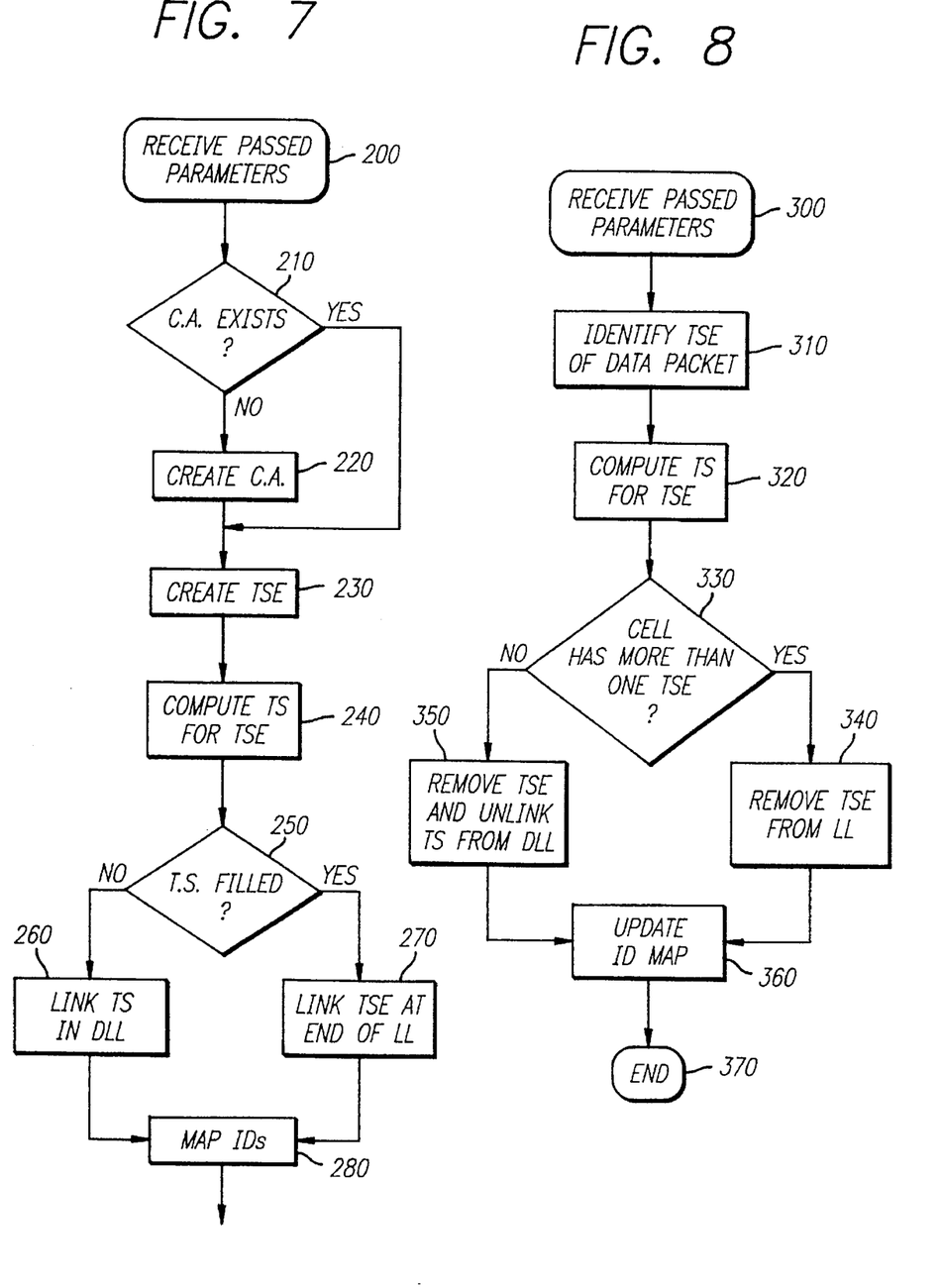

FIG. 7 is a flowchart depicting the steps performed by processor 15 performing the Add function of the present invention. The Add function begins at step 200 by receiving certain passed parameters as arguments from the calling function, needed by the Add function to properly add a time storage entry (TSE). These parameter include but are not limited to: the expiration time of the data packet that is to be associated with a TSE, the handler to be executed by the TSE, any other parameters associated with the handler, and other needed parameters such as a data packet identification number (ID) uniquely associated with a data packet sent out by the network. At steps 210 and 220, the processor checks to see whether a circular array (C.A.) of predetermined granularity has been created, and, if not, one is created. An initial reference cell, such as cell 1 in the example of FIGS. 2–4, is referenced in the circular array, from which elapsed time is to be measured. At step 230, the processor creates a TSE that has a unique one-to-one correspondence with the data packet ID, and the time slot (TS) associated with the expiration time is computed at step 240, which corresponds to a particular numbered cell of the circular array, as measured from the reference cell. At step 250 the processor checks to see if the particular numbered cell has been filled with a TSE before. If not, if the numbered cell is empty, the cell must be included in a doubly linked list having as its origin the initial reference cell 1, as explained above and as indicated by step 260. The processor includes the numbered cell, now empty, in such a doubly linked list, and then adds the TSE to the numbered cell.

If the particular numbered cell computed by the processor in step 240 is not empty, but contains a preexisting TSE, then the insertion of the TSE to be added is slightly simpler, in that the double linked list pointers referencing the non-empty cells do not have to be rearranged, and the TSE to be added is simply attached in a linked list to the preexisting TSE, as indicated by step 270.

Finally, the table or list in memory that identifies which cells hold which TSE's, and which data packets are associated with which TSE's, are updated by the processor in step 280.

Turning attention now to the flowchart of FIG. 8, the Delete function is now described. The Delete function, an external function, receives passed parameters from the calling function that identifies which time storage entry (TSE) is to be deleted, as indicated by step 300. Such passed parameters include, for example, the data packet ID. The passed parameters are used to identify the particular TSE referenced by the circular array that needs to be deleted, as indicated by step 310. The time slot (TS) that the TSE is found in is then computed by the processor, in step 320. The circular array cell associated with the TS is found by processor 15, and in step 330 the cell is checked to see if it contains more than one TSE. If so, the TSE is deleted from the linked list associated with the cell, but there is no need to rearrange any pointers in the doubly linked list linking together the non-empty cells of the circular array, as indicated by step 340. If, however, there is only one TSE in the cell in question, after deleting the TSE the pointers constituting the doubly linked list (DLL) must be rearranged to not reference the now empty cell, as indicated in step 350.

Finally, to complete the Delete function, the processor updates any ID map that relates the TSE's with any identification number, and with any other parameter such as data packet or cell in the circular array, as shown in step 360, and the delete function ends, as indicated in step 370.

Figure 9:
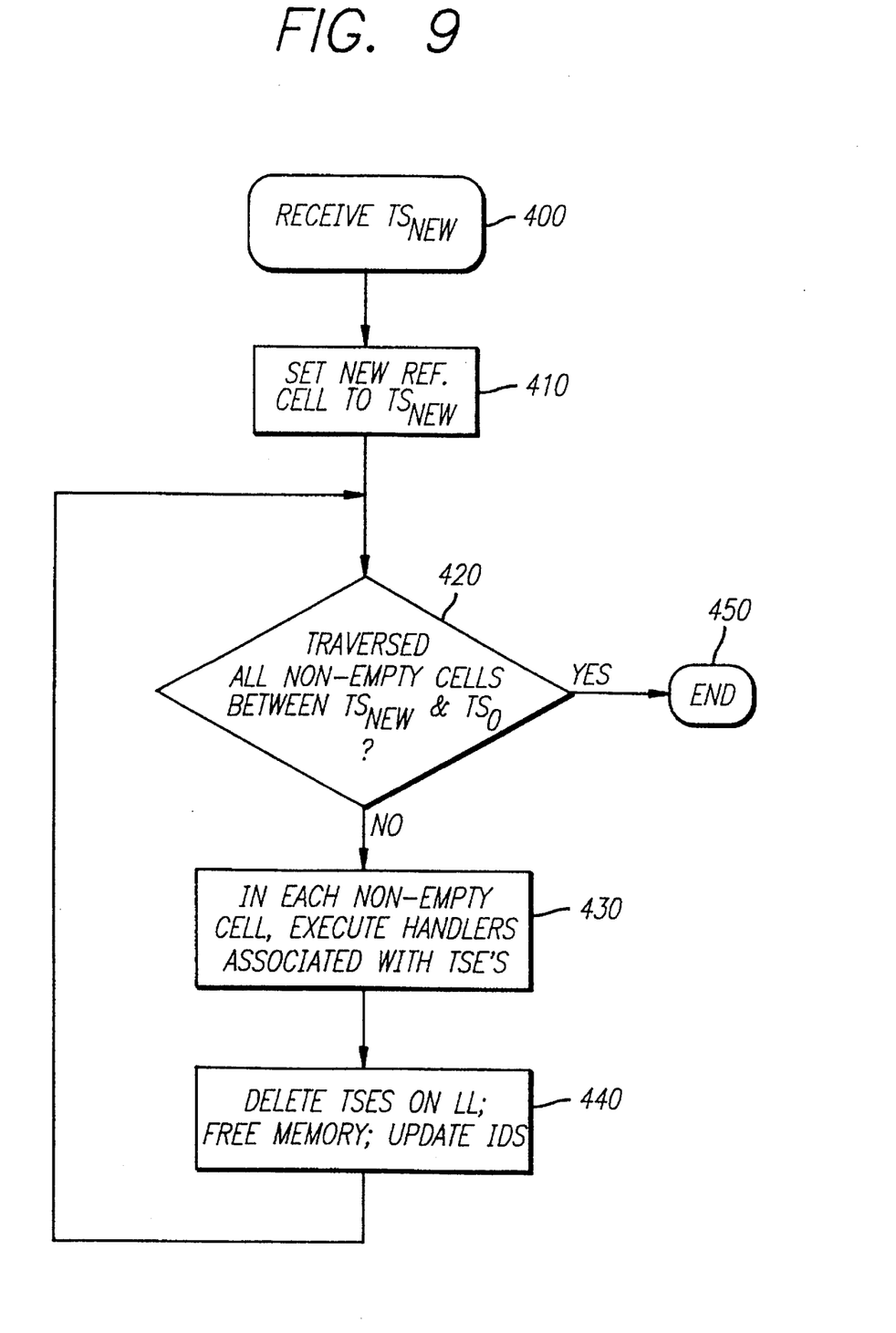

Turning attention now to FIG. 9, there is shown the Pop function of the present invention, which receives from a calling function in step 400 the new time slot ($TS_{new}$), which marks the elapsed time for the Pop function as well as identifies the new reference time, such as represented by cell marker 100 in FIGS. 4 and 5 described above. In step 410 the processor uses the information in $TS_{new}$ to compute a new reference cell (such as cell 11 in FIG. 4) which is greater in time from the old reference cell by an amount equal to the number of cells between the new minus the old reference cells times the unit of time represented by each cell (the granularity). The processor, starting at the old reference cell, $TS_0$, (such as cell 1 in FIG. 4) traverses the non-empty cells in the doubly linked list (DLL) between the original reference cell, $TS_0$ and the new reference cell, $TS_{new}$ as indicated by step 420. As indicated by step 430, the processor finds any TSE's in the non-empty cell and executes the handlers associated with the TSE. Thereafter, in step 440, the TSE is freed and any memory deallocated, and for each non-empty cell traversed all pointers associated with the non-empty cell are deleted, and any ID map is updated.

The processor continues, as indicated by the iterative step of step 420, until the DLL reaches the new reference cell, where the new reference cell becomes the new initial reference cell, as described above, and the Pop function is finished, as indicated by step 450.

In a preferred embodiment the present invention is used for the timing of a Tandem machine running under the NonStop™ kernel and transmitting IPX/SPX data packets under Novell Netware, but in general any hardware running any operating system and any communications protocol may utilize the present invention, including TCP/IP.

While in a preferred embodiment the preferred data structure for storing the linked list pointers that contain the time storage entries is a circular array, as an array has certain properties that make it superior to other data structures, in general one skilled in the art may use another data structure to achieve the invention as disclosed, for example, a circular linked list may be employed in lieu of a circular array. Hence, the foregoing description is offered for illustrative purposes only. Numerous modifications and variations may be readily apparent to those skilled in the art, while still falling within the spirit and scope of the invention as claimed herein below.

What is claimed is:

1. A method of implementing a timer stored in a memory comprising the steps, performed by a processor of a computer data processing system, comprising:

(a) creating at least one time storage entry in the memory of said computer system, said time storage entry associated with a function, said time storage entry set to expire in a predetermined number of arbitrary units of elapsed time;

(b) creating a circular array in said memory having a plurality of cells, and setting a first cell of said array as a reference cell, where each cell represents said predetermined arbitrary unit of elapsed time, and said cells are consecutively ordered from said first reference cell and correspond to elapsed time in a one-to-one manner, with said first reference cell representing the initial reference time, and each consecutively ordered cell representing a unit increase of elapsed time;

(c) associating said time storage entry with one of said plurality of cells that corresponds to said predetermined number of arbitrary units of elapsed time said time storage entry is set to expire in; said associated cell defined as a non-empty cell when at least one time storage entry is associated with it, and an empty cell when no time storage entry is associated with said cell;

(d) associating said first reference cell with said non-empty cell;

whereby said timer is executed by traversing the non-empty cell said time storage entry is associated with and executing said function associated with said time storage entry.

2. The method of claim 1, further comprising the steps of:

storing additional time storage entries in said circular array in said memory;

linking said first reference cell and any nonempty cell in a doubly linked list;

associating each of said additional time storage entries in accordance with steps (b) and (c) of claim 1, by one of the following steps:
 (1) associating each said additional time storage entry with a non-empty cell, by attaching said additional time storage entry with any time storage entry already associated with said non-empty cell in a linked list with said already associated time storage entry, and
 (2) associating said additional time storage entry with a empty cell, whereby said empty cell thereby becomes a non-empty cell and is included in said doubly linked list;

whereby said timer is executed by said processor by traversing said doubly linked list of said array to reference said non-empty cells, and said additional time storage entries associated with said non-empty cells are examined and said function associated with each additional time storage entry is executed.

3. The method of claim 2, further comprising the steps of:

associating with each of said time storage entries a data packet;

wherein said timer is a retransmission timer in a data packet network and said function associated with said time storage entry is a function that retransmits said data packet associated with said time storage entry;

wherein when said timer is executed by said processor, said function executed retransmits said data packet associated with said time storage entry.

4. A method of implementing a timer stored in a memory comprising the steps, performed by a processor of a computer data processing system, comprising:

(a) creating at least one time storage entry in the memory of said computer system, said time storage entry having at least one pointer to a function associated with said time storage entry, said time storage entry set to expire in a predetermined number of arbitrary units of elapsed time;

(b) creating a circular array in said memory having a plurality of cells, and setting a first cell of said array as a reference cell, where each cell represents said predetermined arbitrary unit of elapsed time, and said cells are consecutively ordered from said first reference cell and correspond to elapsed time in a one-to-one manner, with said first reference cell representing the initial reference time, and each consecutively ordered cell representing a unit increase of elapsed time;

(c) associating said time storage entry with one of said plurality of cells that corresponds to said predetermined number of arbitrary units of elapsed time said time storage entry is set to expire in; said associated cell defined as a non-empty cell when at least one time storage entry is associated with it, and an empty cell when no time storage entry is associated with said cell;

(d) linking said first reference cell and said nonempty cell in a doubly linked list;

whereby said timer is executed by traversing said doubly linked list of said array.

5. The method of claim 4, further comprising the steps of:

storing additional time storage entries in said circular array in said memory;

linking said first reference cell with said plurality of non-empty cells in a doubly linked list;

associating each of said additional time storage entries in accordance with steps (b) and (c) of claim 4, by one of the following steps:
 (1) associating each said additional time storage entry with a non-empty cell, by attaching said additional time storage entry with any time storage entry already associated with said non-empty cell in a linked list with said already associated time storage entry, and
 (2) associating said additional time storage entry with a empty cell, whereby said empty cell thereby becomes a non-empty cell and is included in said doubly linked list.

6. The method of claim 5, further comprising the steps of:

executing all expired timers at a certain second, lapsed time from said first initial reference time, comprising the steps of:
 (1) traversing said doubly linked list, and examining all non-empty cells starting from said first, reference cell, and including all non-empty cells between said first cell and the cell associated with said second, lapsed time;
 (2) traversing and examining every time storage entry in each non-empty cell examined in step (1) in said doubly linked list, and executing each said function in every said time storage entry examined, until the processor comes to end of the doubly linked list in said cell associated with said second, lapsed time; and
 (3) making said second, lapsed time the new initial reference time, and said cell associated with said second, lapsed time the new reference cell, whereby the above process may by repeated by the processor.

7. The method of claim 6, further comprising the steps of:

associating each said function for each said time storage entry with a particular data packet transmitted by a TCP/IP protocol network;

executing said timer, so that said network retransmits said data packet.

8. A computer having a timer protocol comprising:

a processor, memory, and I/O ports, said computer transmitting data packets through said I/O ports;

means for creating in said primary memory a time storage entry, said time storage entry associated with a predetermined data packet transmitted;

means for creating in said memory a circular array having a plurality of cells, each of said cells representing a unit increase of elapsed time, with one cell of said circular array designating a reference time from which the other cells are measured;

means for associating said time storage entry with a predetermined cell of said circular array;

whereby said computer executes said timer protocol by traversing said circular array, and identifies said predetermined data packet transmitted that is associated with 'said time storage entry.

9. The computer with an improved timer protocol according to claim 8, wherein:

means for associating said predetermined cell of said circular array with said one cell designating a reference time, to form a doubly linked list;

said means for creating in said memory a time storage entry create a plurality of such time storage entries, each of said plurality of time storage entries uniquely associated with a predetermined data packet transmitted by said workstation; and each of said time storage entries are associated with cells of said circular array, and said associated cells are associated to one another and to said one cell designating a reference time, by said doubly linked list means for associating;

wherein said computer executes said timer protocol by traversing said doubly linked list, and identifying each of said predetermined data packets associated with each of said time storage entries, and wherein said workstation retransmits each of said data packets so identified.

* * * * *